(12) United States Patent
Kwag et al.

(10) Patent No.: US 8,982,534 B2
(45) Date of Patent: Mar. 17, 2015

(54) MULTILAYER CERAMIC ELECTRONIC COMPONENT AND METHOD OF MANUFACTURING THE SAME

(71) Applicant: Samsung Electro-Mechanics Co., Ltd., Suwon, Gyunggi-do (KR)

(72) Inventors: Joon Hwan Kwag, Gyunggi-do (KR); Sang Huk Kim, Gyunggi-do (KR)

(73) Assignee: Samsung Electro-Mechanics Co., Ltd., Suwon (KR)

( * ) Notice: Subject to any disclaimer, the term of this patent is extended or adjusted under 35 U.S.C. 154(b) by 79 days.

(21) Appl. No.: 13/794,340

(22) Filed: Mar. 11, 2013

(65) Prior Publication Data
US 2014/0029157 A1    Jan. 30, 2014

(30) Foreign Application Priority Data

Jul. 26, 2012  (KR) .................. 10-2012-0081687

(51) Int. Cl.
*H01G 4/228*  (2006.01)
*H01G 4/30*   (2006.01)
*H01G 4/232*  (2006.01)

(52) U.S. Cl.
CPC . *H01G 4/30* (2013.01); *H01G 4/232* (2013.01)
USPC .............. 361/306.3; 361/301.2; 361/301.4; 361/321.1; 361/321.2; 361/306.1

(58) Field of Classification Search
CPC ........... H01G 4/005; H01G 4/12; H01G 4/30; H01G 4/232; H01G 4/2325
USPC ............... 361/306.3, 306.1, 303–305, 301.2, 361/301.4, 311–313, 321.1, 321.2
See application file for complete search history.

(56) References Cited

U.S. PATENT DOCUMENTS 6,124,769 A * 9/2000 Igarashi et al. ............... 333/172

FOREIGN PATENT DOCUMENTS

| JP | 07-057959 | 3/1995 |
| JP | 11-126731 A | 5/1999 |
| JP | 2000-243661 A | 9/2000 |
| JP | 2010-267687 A | 11/2010 |

OTHER PUBLICATIONS

Korean Office Action issued in Application No. 10-2012-0081687 dated Nov. 5, 2013.
Notice of Office Action Japanese Patent Application No. 2012-231117 dated Sep. 3, 2013.

* cited by examiner

*Primary Examiner* — Nguyen T Ha
(74) *Attorney, Agent, or Firm* — McDermott Will & Emery LLP

(57) ABSTRACT

There is provided a multilayer ceramic electronic component including: a ceramic main body including a dielectric layer and internal electrodes disposed to face each other, while having the dielectric layer interposed therebetween; and external electrodes electrically connected to the internal electrodes, wherein the external electrodes include first external electrodes formed on outer surfaces of the ceramic main body and second external electrodes formed outwardly of the first external electrodes, and protective layers including one or more of an oxide layer and a glass layer are formed between the first external electrodes and the second external electrodes.

12 Claims, 4 Drawing Sheets

MULTILAYER CERAMIC ELECTRONIC COMPONENT AND METHOD OF MANUFACTURING THE SAME

CROSS-REFERENCE TO RELATED APPLICATIONS

This application claims the priority of Korean Patent Application No. 10-2012-0081687 filed on Jul. 26, 2012, in the Korean Intellectual Property Office, the disclosure of which is incorporated herein by reference.

BACKGROUND OF THE INVENTION

1. Field of the Invention

The present invention relates to a high capacity multilayer ceramic electronic component having excellent reliability, while having thinned external electrodes, by preventing infiltration of a plating solution into internal electrodes.

2. Description of the Related Art

Recently, as electronic products have been reduced in size, multilayer ceramic electronic components have also been required to be reduced in size, yet retain a large capacity.

Thus, various methods have been attempted in order to allow dielectric layers and internal electrodes to be thinned and stacked in greater numbers, and recently, multilayer ceramic electronic components in which dielectric layers have been thinned and stacked in greater numbers have been fabricated.

In addition, since external electrodes have also been required to be thinned, potentially causing a problem in which a plating solution infiltrates into a chip through thinned external electrodes, it is difficult to reduce the size of the multilayer ceramic electronic component.

In particular, in the case that the shape of the external electrodes is not uniform, the possibility that the plating solution will infiltrate into a thinner portion is further increased, resulting in a failure to secure reliability.

Thus, in a case in which a high capacitance product has a small size, attaining product reliability is a critical factor.

In general, in order to prevent infiltration of the plating solution, low temperature glass powder and fine copper powder that enhance hermetic sealing of the external electrodes are used.

However, low temperature glass powder has low acid resistance, and may be dissolved due to a plated layer formed on the external electrode, thus having degraded reliability.

The related art document hereinbelow discloses an external electrode including an oxide film, but it has an insufficient effect in enhancing hermetic sealing of the external electrode.

RELATED ART DOCUMENT (Patent Document 1) Japanese Patent Laid-Open Publication No. 1995-057959

SUMMARY OF THE INVENTION

An aspect of the present invention provides a high capacity multilayer ceramic electronic component having excellent reliability, even while having thinned external electrodes, by preventing infiltration of a plating solution into internal electrodes.

According to an aspect of the present invention, there is provided a multilayer ceramic electronic component including: a ceramic main body including a dielectric layer and internal electrodes disposed to face each other, while having the dielectric layer interposed therebetween; and external electrodes electrically connected to the internal electrodes, wherein the external electrodes include first external electrodes formed on outer surfaces of the ceramic main body and second external electrodes formed outwardly of the first external electrodes, and protective layers including one or more of an oxide layer and a glass layer are formed between the first external electrodes and the second external electrodes.

The oxide layer may include copper oxide (CuO).

The first external electrodes may include a conductive metal of 60 wt % or less of overall weight.

The conductive metal may be one or more selected from the group consisting of copper (Cu), nickel (Ni), silver (Ag), and silver-palladium (Ag—Pd).

The second external electrodes may include a conductive metal of 60 wt % or less of overall weight.

The conductive metal may be one or more selected from the group consisting of copper (Cu), nickel (Ni), silver (Ag), and silver-palladium (Ag—Pd).

The external electrodes may have a plated layer formed thereon.

According to another aspect of the present invention, there is provided a method of manufacturing a multilayer ceramic electronic component, the method including: preparing a ceramic main body including a dielectric layer and a plurality of internal electrodes disposed to face each other, while having the dielectric layer interposed therebetween; preparing a conductive paste for external electrodes including a conductive metal; applying the conductive paste for external electrodes to end portions of the ceramic main body to form first external electrodes such that the first external electrodes are electrically connected to the internal electrodes; thermally treating the ceramic main body to form protective layers including oxide layers on the first external electrodes; forming second external electrodes on the oxide layers; and firing the ceramic main body.

The thermally treating of the ceramic main body may be performed within a temperature range of 200° C. to 500° C.

The protective layers may further include glass layers.

The firing of the ceramic main body may be performed such that a portion of an oxide included in the oxide layers is reduced to a metal.

The oxide layer may include copper oxide (CuO).

The method may further include forming plated layers on the external electrodes.

BRIEF DESCRIPTION OF THE DRAWINGS

The above and other aspects, features and other advantages of the present invention will be more clearly understood from the following detailed description taken in conjunction with the accompanying drawings, in which.

DETAILED DESCRIPTION OF THE EMBODIMENTS

Figure 1:
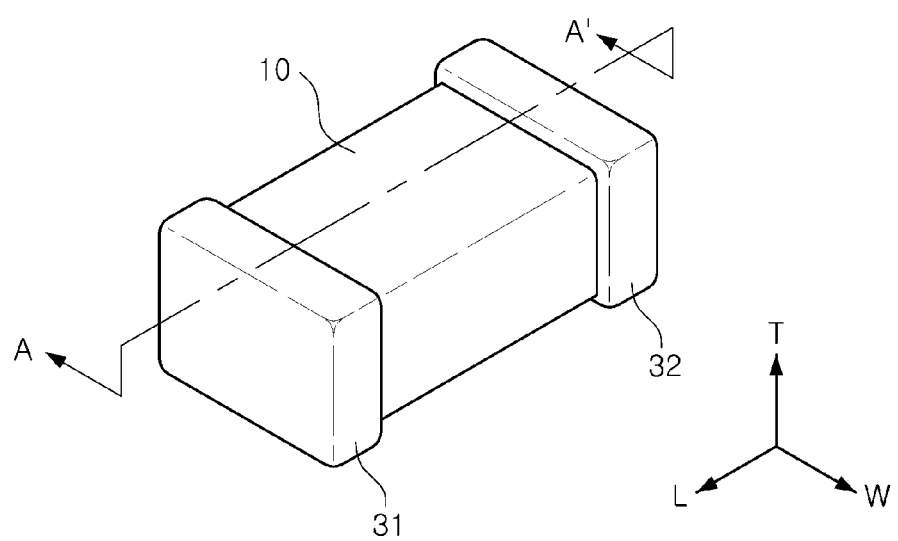
FIG. 1 is a perspective view schematically illustrating a multilayer ceramic capacitor (MLCC) according to an embodiment of the present invention.

The embodiments of the present invention may be modified in many different forms and the scope of the invention should not be limited to the embodiments set forth herein. Rather, these embodiments are provided so that this disclosure will be thorough and complete, and will fully convey the concept of the invention to those skilled in the art. In the drawings, the shapes and dimensions of elements may be exaggerated for clarity, and the same reference numerals will be used throughout to designate the same or like elements.

Hereinafter, embodiments of the present invention will be described in detail with reference to the accompanying drawings.

FIG. 1 is a perspective view schematically illustrating a multilayer ceramic capacitor (MLCC) according to an embodiment of the present invention.

Figure 2:
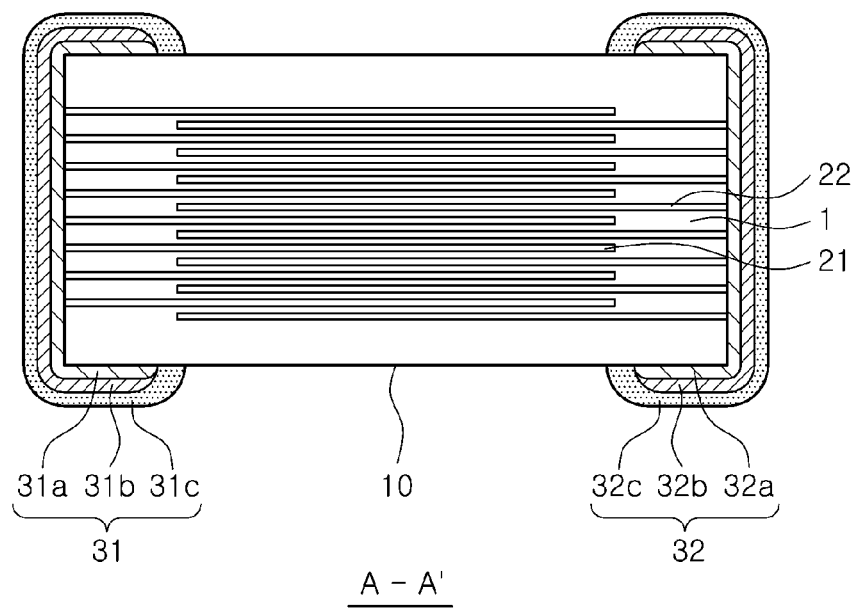
FIG. 2 is a cross-sectional view taken along line A-A' of FIG. 1.

FIG. 2 is a cross-sectional view taken along line A-A' of FIG. 1.

Referring to FIGS. 1 and 2, a multilayer ceramic electronic component according to an embodiment of the present invention includes a ceramic main body 10 including a dielectric layer 1 and internal electrodes 21 and 22 disposed to face each other, while having the dielectric layer 1 interposed therebetween; and external electrodes 31 and 32 electrically connected to the internal electrodes 21 and 22, wherein the external electrodes 31 and 32 may include first external electrodes 31a and 32a formed on outer surfaces of the ceramic main body 10 and second external electrodes 31c and 32c formed outwardly of the first external electrodes 31a and 32a, and protective layers 31b and 32b including one or more of an oxide layer and a glass layer may be formed between the first external electrodes 31a and 32a and the second external electrodes 31c and 32c.

The internal electrodes 21 and 22 may be formed such that one end thereof is alternately exposed to ends of the ceramic main body in a length direction.

The oxide layer may include copper oxide (CuO).

The first external electrodes 31a and 32a may include 60 wt % or less of overall weight of a conductive metal. The conductive metal may be one or more selected from the group consisting of copper (Cu), nickel (Ni), silver (Ag), and silver-palladium (Ag—Pd).

The second external electrodes 31c and 32c may include 60 wt % or less of overall weight of a conductive metal. The conductive metal may be one or more selected from the group consisting of copper (Cu), nickel (Ni), silver (Ag), and silver-palladium (Ag—Pd).

A plated layer may be further formed on the external electrodes 31 and 32.

Hereinafter, the multilayer ceramic electronic component according to an embodiment of the present invention will be described, and in particular, a multilayer ceramic capacitor (MLCC) will be taken as an example of the multilayer ceramic electronic component, but the present invention is not limited thereto.

The ceramic main body 10 may have a rectangular parallelepiped shape, but the present invention is not limited thereto.

Meanwhile, in the MLCC according to the present embodiment, it is defined that a 'length direction' is the 'L' direction, a 'width direction' is the 'W' direction, and a 'thickness direction' is the 'T' direction in FIG. 1. Here, the 'thickness direction' may be used to have the same concept as a 'lamination direction', a direction in which dielectric layers are stacked.

According to an embodiment of the present invention, a raw material for forming the dielectric layer 1 is not particularly limited as long as sufficient capacitance is obtained therewith. For example, the raw material may be powder such as barium titanate ($BaTiO_3$).

As for the material of the dielectric layer 1, various materials such as a ceramic additive, an organic solvent, a plasticizer, a bonding agent, a dispersing agent, or the like, may be added to the powder such as barium titanate ($BaTiO_3$), according to the purpose of the present invention.

A material for forming the inner electrodes 21 and 22 may not be particularly limited. For example, the inner electrodes 21 and 22 may be formed by using a conductive paste made of one or more of silver (Ag), lead (Pb), platinum (Pt), nickel (Ni), and copper (Cu).

The MLCC according to an embodiment of the present invention may include the external electrodes 31 and 32 electrically connected to the internal electrodes 21 and 22.

The external electrodes 31 and 32 may be electrically connected to the internal electrodes 21 and 22 to form capacitance.

According to an embodiment of the present invention, the external electrodes 31 and 32 may include the first external electrodes 31a and 32a formed on the outer surfaces of the ceramic main body 10 and the second external electrodes 31c and 32c formed outwardly of the first external electrodes 31a and 32a, and the protective layers 31b and 32b including one or more of an oxide layer and a glass layer may be formed between the first external electrodes 31a and 32a and the second external electrodes 31c and 32c.

The first external electrodes 31a and 32a may be made of the same conductive material as that of the internal electrodes, but the present invention is not limited thereto and the conductive material may be one or more selected from the group consisting of copper (Cu), nickel (Ni), silver (Ag), and silver-palladium (Ag—Pd).

According to an embodiment of the present invention, the first external electrodes 31a and 32a may be made of a conductive metal including copper (Cu).

Also, the first external electrodes 31a and 32a may include a conductive metal of 60 wt % or less of overall weight, but the present invention is not limited thereto.

The first external electrodes 31a and 32a may be formed by applying a conductive paste prepared by adding glass frit to conductive metal powder to the outer surfaces of the ceramic main body 10 and subsequently firing the same.

In addition, the first external electrodes 31a and 32a may be disposed to form an anti-arc gap in one surface of the ceramic main body 10, but the present invention is not limited thereto.

According to an embodiment of the present invention, the protective layers 31b and 32b including one or more of an oxide layer and a glass layer may be formed between the first external electrodes 31a and 32a and the second external electrodes 31c and 32c to prevent infiltration of a plating solution into the internal electrodes, whereby a high capacity multilayer ceramic electronic component having excellent reliability can be implemented even in the case that the external electrodes are formed to be thinner.

Between the first external electrodes 31a and 32a and the second external electrodes 31c and 32c, only an oxide layer may exist or only a glass layer may be formed, or glass in a wet state may exist on the oxide layer.

In the case that one or more of the oxide layer and the glass layer exist between the first external electrodes 31a and 32a and the second external electrodes 31c and 32c, a problem of a degradation of reliability due to glass dissolved in plating nickel/tin (Ni/Sn) to mount the MLCC on a printed circuit board (PCB) can be solved.

In general, in order to implement a very small and ultra-high capacity MLCC, the thickness of external electrodes tends to be decreased, and thus, the necessity for external electrodes to be hermetically sealed is increasing.

However, in the case that low temperature glass powder and fine metal powder are used in external electrodes to enhance hermetic sealing and nickel/tin (Ni/Sn) plating is performed to mount the MLCC on the PCB, glass may be dissolved leading to a degradation in reliability.

According to an embodiment of the present invention, even in the case that the low temperature glass powder and fine metal powder are used to hermetically seal the external electrodes as mentioned above, since the protective layers 31b and 32b including one or more of an oxide layer and a glass layer are formed between the first external electrodes 31a and 32a and the second external electrodes 31c and 32c, the foregoing problems may be solved.

After the first external electrodes 31a and 32a are formed on outer surfaces of the ceramic main body 10, the first external electrodes 31a and 32a may be thermally treated at a certain temperature to form the oxide layer on the first external electrodes 31a and 32a.

The oxide layer may include copper oxide (CuO), but the present invention is not limited thereto. Namely, the oxide layer may include various materials according to a type of a conductive metal included in the first external electrodes 31a and 32a.

Namely, the oxide layer may be understood as a layer formed as the conductive metal included in the first external electrodes 31a and 32a is oxidized during the thermal treatment of the ceramic main body 10.

Hereinafter, details of the formation of the oxide layer will be described in a method of manufacturing a multilayer ceramic electronic component.

The glass layer may be formed as glass included in the second external electrodes 31c and 32c formed outwardly of the first external electrodes 31a and 32a moves toward the first external electrodes 31a and 32a, and here, the glass may exist in a wet state on the oxide layer.

By forming the protective layer including one or more of the oxide layer and the glass layer between the first external electrodes 31a and 32a and the second external electrodes 31c and 32c, hermetic sealing of the external electrodes can be enhanced and an MLCC having excellent reliability can be implemented.

The first external electrodes 31a and 32a may be made of the same conductive material as that of the internal electrodes, but the present invention is not limited thereto and the conductive material may be one or more selected from the group consisting of copper (Cu), nickel (Ni), silver (Ag), and silver-palladium (Ag—Pd).

According to an embodiment of the present invention, the first external electrodes 31a and 32a may be made of a conductive metal including copper (Cu).

In this case, the oxide layer may include copper oxide (CuO).

Also, the first external electrodes 31a and 32a may include a conductive metal of 60 wt % or less of overall weight, but the present invention is not limited thereto.

A plated layer (not shown) may be further formed on the external electrodes 31 and 32, and here, the plated layer may be a nickel/tin (Ni/Sn) plated layer, but the present invention is not limited thereto.

Figure 3:
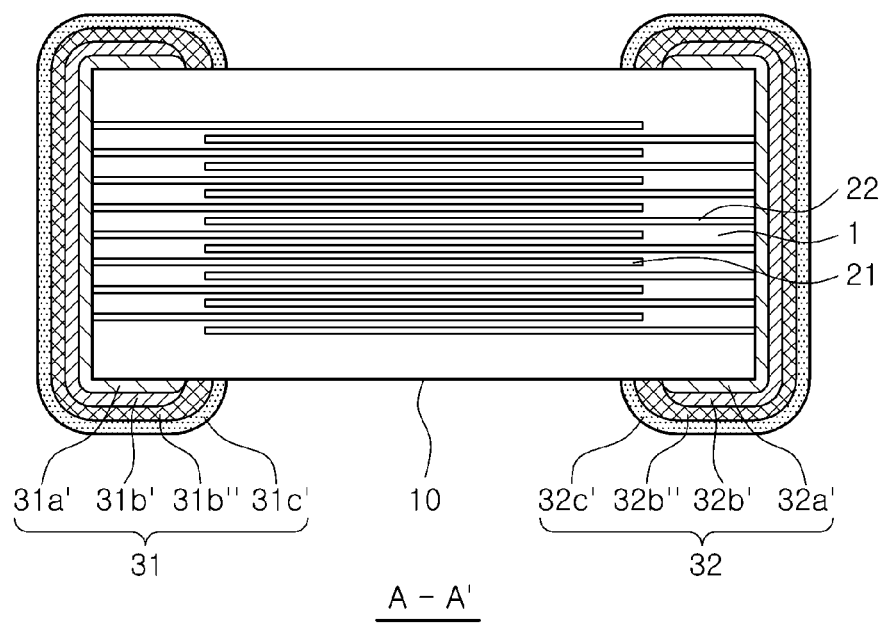
FIG. 3 is a cross-sectional view taken along line A-A' of FIG. 1 according to another embodiment of the present invention.

FIG. 3 is a cross-sectional view taken along line A-A' of FIG. 1 according to another embodiment of the present invention.

Referring to FIG. 3, in a multilayer ceramic electronic component according to another embodiment of the present invention, oxide layers 31b' and 32b' and glass layers 31b" and 32b" may be simultaneously formed between the first external electrodes 31a' and 32a' and the second external electrodes 31c' and 32c'.

Accordingly, hermetic sealing of the external electrodes may be further enhanced, thus implementing a multilayer ceramic capacitor having excellent reliability.

Other characteristics are the same as those of the multilayer ceramic electronic component according to an embodiment of the present invention, so a detailed description thereof will be omitted.

Figure 4:
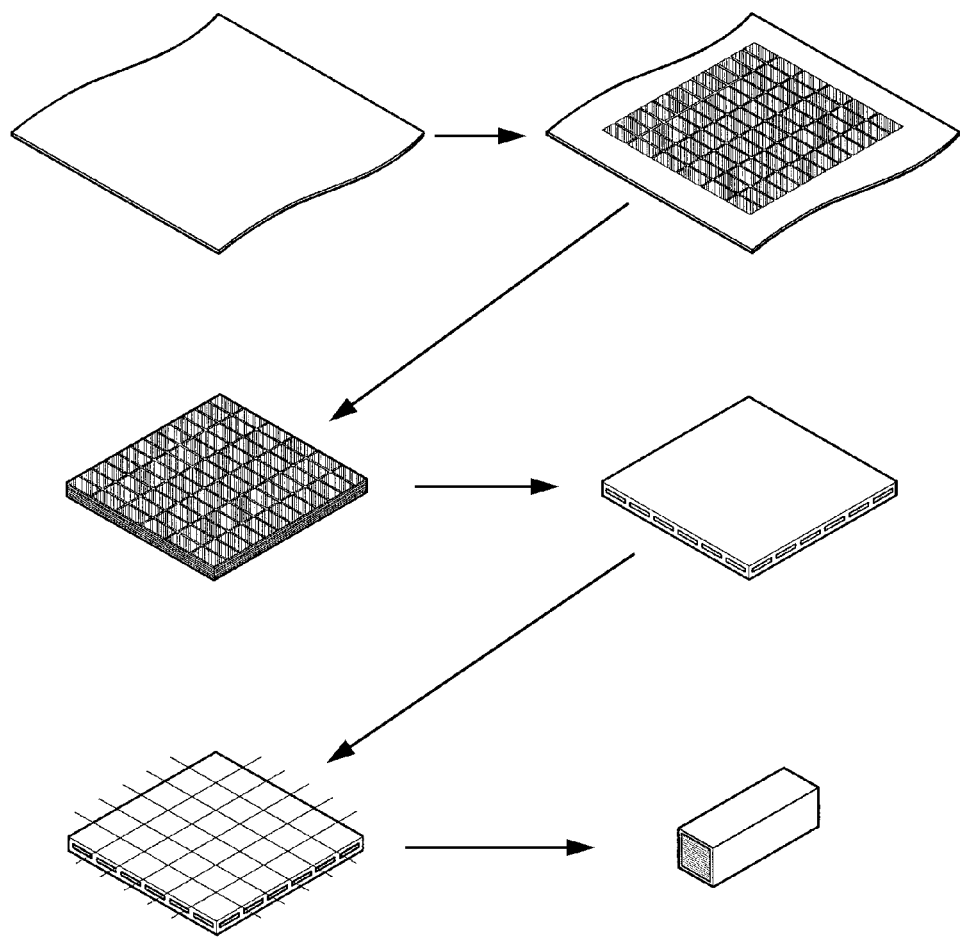
FIG. 4 is a view illustrating a manufacturing process of an MLCC according to another embodiment of the present invention.

FIG. 4 is a view illustrating a manufacturing process of an MLCC according to another embodiment of the present invention.

Referring to FIG. 4, a method of manufacturing a multilayer ceramic electronic component according to another embodiment of the present invention includes: preparing a ceramic main body including a dielectric layer and a plurality of internal electrodes disposed to face each other, while having the dielectric layer interposed therebetween; preparing a conductive paste for external electrodes including a conductive metal; applying the conductive paste for external electrodes to end portions of the ceramic main body to form first external electrodes such that the first external electrodes are electrically connected to the internal electrodes; thermally treating the ceramic main body to form protective layers including oxide layers on the first external electrodes; forming second external electrodes on the oxide layers; and firing the ceramic main body.

Hereinafter, a method of manufacturing a multilayer ceramic electronic component according to another embodiment of the present invention will be described by using, in particular, a multilayer ceramic capacitor as an example, but the present invention is not limited thereto.

Also, the repeated part of the characteristics of the multilayer ceramic electronic component according to an embodiment of the present invention as described above will be omitted.

An MLCC according to the present embodiment may be prepared through the following processes.

First, slurry including a powder such as barium titanate ($BaTiO_3$) powder, or the like, may be applied to carrier films and subsequently dried to prepare a plurality of ceramic green sheets, thus forming dielectric layers.

A thickness of the plurality of ceramic green sheets may be set such that an average thickness of the dielectric layers after firing is 1.0 μm.

Next, a conductive paste for internal electrodes, including metal particles having an average size of 0.05 to 0.2 μm, may be prepared, and here, an average size of metal particles may be variably set according to the thickness of internal electrodes.

The metal is not particularly limited and may be, for example, one or more material among silver (Ag), lead (Pb), platinum (Pt), nickel (Ni), and copper (Cu).

The conductive paste for internal electrodes may be applied to the green sheets through a screen printing method to thereby form internal electrodes, and the green sheets may be subsequently laminated to form a lamination.

Then, the lamination may be compressed and cut to generate chips (1.0 mm×0.5 mm×0.5 mm in length×width×thickness) having a 1005 standard size, and the chip may be fired at a temperature range of 1050° C. to 1200° C. under a reducing atmosphere of $H_2$ equal to or less than 0.1%, thus preparing a ceramic main body.

Thereafter, a conductive paste for external electrodes, including a conductive metal, may be prepared and applied to end portions of the ceramic main body so as to be electrically connected to the internal electrodes, thus forming first external electrodes.

The first external electrodes may be prepared by dipping the end portions of the ceramic main body in the conductive paste for external electrodes, but the present invention is not limited thereto, and the first external electrodes may be manufactured through various methods.

Also, the first external electrodes may include a conductive metal of a 60 wt % or less of overall weight, and here, the conductive metal may be one or more selected from the group consisting of copper (Cu), nickel (Ni), silver (Ag), and silver-palladium (Ag—Pd).

Thereafter, the ceramic main body may be thermally treated to form protective layers including oxide layers on the first external electrodes.

The thermal treatment of the ceramic main body may be performed within a temperature range of 200° C. to 500° C., but the present invention is not limited thereto.

The oxide layers may be formed on the first external electrodes by thermally treating the ceramic main body within a temperature range of 200° C. to 500° C.

The oxide layers may include various metal oxides according to a type of conductive metal included in the first external electrodes. In particular, in the case that the first external electrode includes copper (Cu), the oxide layer may include copper oxide (CuO).

Next, second external electrodes may be formed on the oxide layers.

The second external electrodes may be formed by using the same method as that of the first external electrodes, and in particular, the second external electrodes may be formed by a dipping method.

Also, the second external electrodes may include a conductive metal of 60 wt % or less of overall weight, and here, the conductive metal may be one or more selected from the group consisting of copper (Cu), nickel (Ni), silver (Ag), and silver-palladium (Ag—Pd).

Subsequently, the external electrodes may be formed by firing the ceramic main body.

The firing of the ceramic main body may be performed such that a certain amount of an oxide included in the oxide layer is reduced to a metal.

Namely, the firing of the ceramic main body may be performed under a reducing atmosphere, and in this process, a portion of the oxide included in the oxide layer formed between the first and second external electrodes may be reduced to a metal.

Also, since glass included in the second external electrode exists in a wet state in the oxide layer, hermetic sealing of the external electrode can be improved.

Finally, for mounting the ceramic main body on a PCB, a plating process, or the like, is performed on the second external electrode to thus prepare a multilayer ceramic capacitor.

The plating process may be performed through a general method, without being particularly limited, to form a nickel/tin (Ni/Sn) plated layer.

The multilayer ceramic electronic component manufactured according to the method of manufacturing a multilayer ceramic electronic component according to another embodiment of the present invention has excellent reliability even in the case that the external electrodes are thinned by preventing infiltration of a plating solution into the internal electrodes.

Namely, owing to the protective layer including the oxide layer and the glass layer existing in a wet state on the oxide layer between the first external electrodes and the second external electrodes, hermetic sealing of the external electrodes can be improved, thus implementing a multilayer ceramic electronic component having excellent reliability.

As set forth above, according to embodiments of the invention, a high capacity multilayer ceramic electronic component having excellent reliability can be implemented by preventing infiltration of a plating solution into internal electrodes even in the case that it has thinned external electrodes.

While the present invention has been shown and described in connection with the embodiments, it will be apparent to those skilled in the art that modifications and variations can be made without departing from the spirit and scope of the invention as defined by the appended claims.

What is claimed is:

1. A multilayer ceramic electronic component comprising:
a ceramic main body including a dielectric layer and internal electrodes disposed to face each other, while having the dielectric layer interposed therebetween; and
external electrodes electrically connected to the internal electrodes,
wherein the external electrodes include first external electrodes formed on outer surfaces of the ceramic main body and second external electrodes formed outwardly of the first external electrodes, and protective layers including an oxide layer and a glass layer formed between the first external electrodes and the second external electrodes.

2. The multilayer ceramic electronic component of claim 1, wherein the oxide layer includes copper oxide (CuO).

3. The multilayer ceramic electronic component of claim 1, wherein the first external electrodes include a conductive metal of 60 wt % or less of overall weight.

4. The multilayer ceramic electronic component of claim 3, wherein the conductive metal is one or more selected from the group consisting of copper (Cu), nickel (Ni), silver (Ag), and silver-palladium (Ag—Pd).

5. The multilayer ceramic electronic component of claim 1, wherein the second external electrodes include a conductive metal of 60 wt % or less of overall weight.

6. The multilayer ceramic electronic component of claim 5, wherein the conductive metal is one or more selected from the group consisting of copper (Cu), nickel (Ni), silver (Ag), and silver-palladium (Ag—Pd).

7. The multilayer ceramic electronic component of claim 1, wherein the external electrodes have a plated layer formed thereon.

8. A method of manufacturing a multilayer ceramic electronic component, the method comprising:
preparing a ceramic main body including a dielectric layer and a plurality of internal electrodes disposed to face each other, while having the dielectric layer interposed therebetween;
preparing a conductive paste for external electrodes including a conductive metal;
applying the conductive paste for external electrodes to end portions of the ceramic main body to form first external electrodes such that the first external electrodes are electrically connected to the internal electrodes;
thermally treating the ceramic main body to form protective layers including oxide layers and glass layers on the first external electrodes;
forming second external electrodes on the oxide layers, wherein the oxide layer and the glass layer are formed between the first external electrodes and the second external electrodes; and
firing the ceramic main body.

9. The method of claim 8, wherein the thermally treating of the ceramic main body is performed within a temperature range of 200° C. to 500° C.

10. The method of claim 8, wherein the firing of the ceramic main body is performed such that a portion of an oxide included in the oxide layers is reduced to a metal.

11. The method of claim 8, wherein the oxide layer includes copper oxide (CuO).

12. The method of claim 8, further comprising forming plated layers on the external electrodes.

* * * * *